June 28, 1966  A. K. SMITH  3,258,577
WELDING

Filed Dec. 16, 1963  3 Sheets-Sheet 1

Inventor
Allan K. Smith
By ᒪ. Moran
Attorney

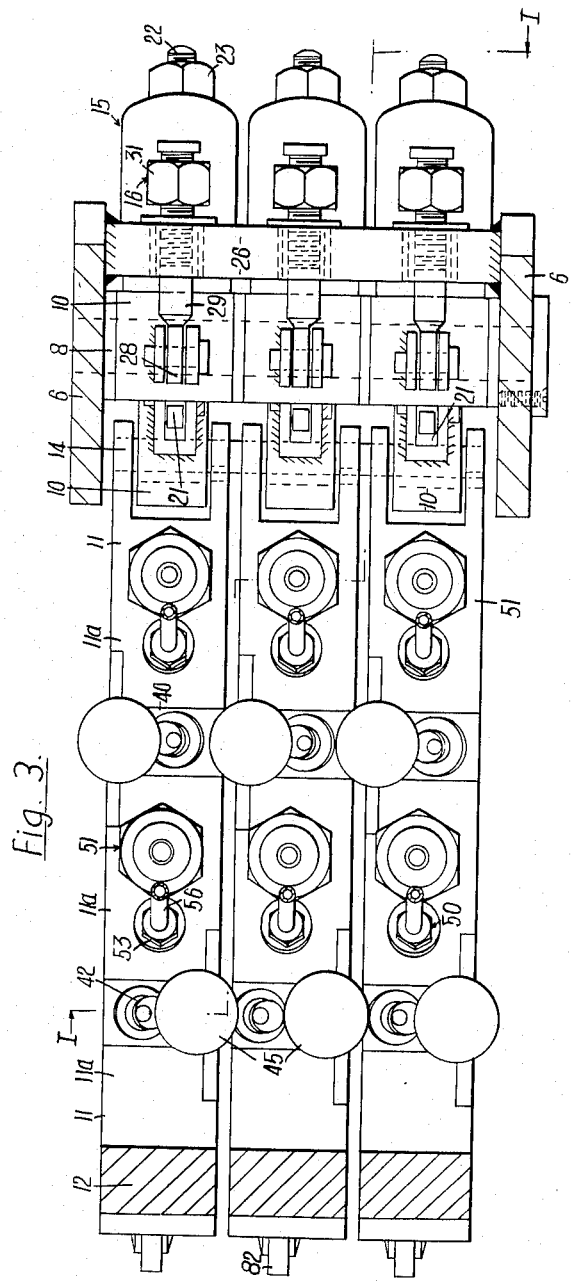

United States Patent Office 3,258,577
Patented June 28, 1966

3,258,577
WELDING
Allan K. Smith, London, England, assignor to Babcock & Wilcox Limited, London, England, a British company
Filed Dec. 16, 1963, Ser. No. 330,971
Claims priority, application Great Britain, Dec. 17, 1962, 47,505/62
5 Claims. (Cl. 219—137)

In boiler construction it is becoming increasingly common to form the boiler walls on site from tube panels preformed in the workshop. The panels may consist of tubes welded to spacers interposed between them or directly to each other in which case fins may advantageously be formed on the tubes to facilitate the deposition of the weld metal between the tubes.

It has been proposed to form these tube panels by arranging the tubes and spacers, if spacers are to be used, on a bed and moving welding electrodes simultaneously longitudinally of the tubes to form continuous welds by the submerged arc process. Although the submerged arc process generally produces a satisfactory weld it has disadvantages that could be avoided by the use of a shielded arc process. In forming an extended weld by means of shielded arc welding, however, problems have frequently arisen from arc blow.

An object of the present invention is to provide a method by which an extended weld may be formed by shielded arc welding with less, or no, risk of arc blow occurring. The invention also aims to provide apparatus suitable for use in such a method.

According to the present invention, there is provided a method of connecting a tube to a further tube, or to a strip lying alongside said tube, by means of a weld effected by a welding electrode between which and the work there is progressive relative movement lengthwise of the work during the welding process, wherein the weld is effected by gas-shielded arc welding and the return electrode moves in contact with the work immediately behind the welding electrode.

According to the present invention, there is also provided a method of connecting a tube to a further tube, or to a strip lying alongside said tube, by means of a weld effected by a welding electrode between which and the work there is progressive relative movement lengthwise of the work during the welding process wherein the weld is effected by gas-shielded arc welding and the return electrode lies behind the welding electrode in contact with the work at a separation from the welding electrode which is less that that at which arc blow would occur.

The present invention also provides support means for use in welding apparatus, the support means being provided with a welding nozzle support and being adapted for use in producing a weld between a tube and an adjacent tube, or adjacent spacer, by relative movement between the support means and the work in the longitudinal direction of the work, the support means also being provided with a return electrode mounted so as to engage the work adjacent to, and behind, the welding electrode in the direction of relative movement and with means for leading shielding gas to the welding zone.

An advantage of using shielded arc welding rather than submerged arc welding lies in the fact that any misalignment of the welding electrode can be detected sooner and corrected immediately whereas in the weld produced by the submerged arc process misalignment can be detected only after the welding electrode has moved on several feet and the slag removed. Slag removal, too, presents less of a problem in shielded arc processes since little slag is formed and, moreover, the initial fit up of the components of a panel may be made within wider tolerances. In additon, contraction forces are less in the shielded arc process and this is particularly advantageous in forming panels having openings since the dimensions of the openings may be more strictly controlled.

By way of example, an embodiment of the invention will now be described with reference to the accompanying drawings in which:

FIGURE 3 shows a transverse cross-section on the line III—III of FIGURE 2.

Figure 1:
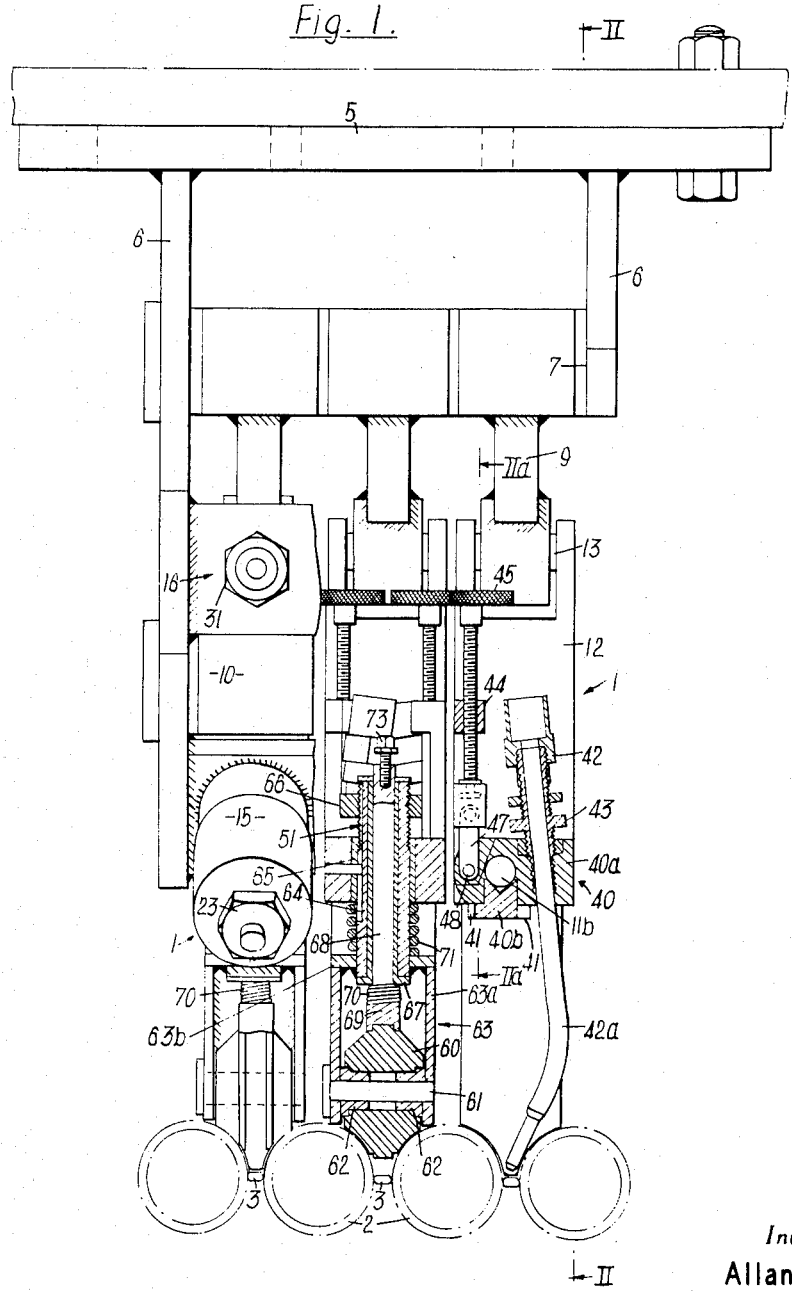
FIGURE 1 shows in rear view, partly cut away to the line I—I of FIGURE 3, a unit by means of which six welding electrodes may be moved simultaneously lengthwise of the components of a tube panel.
Figure 2:
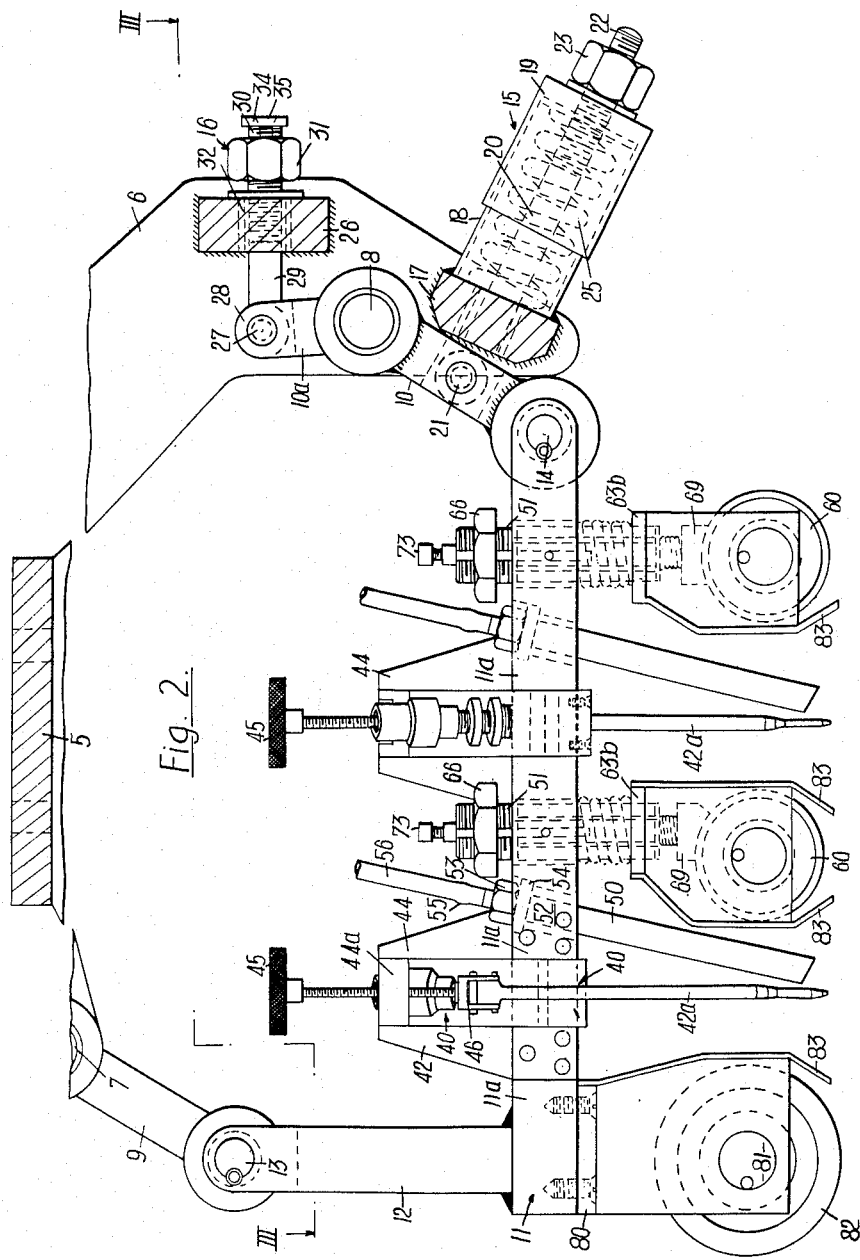
FIGURE 2 shows a longitudinal cross-section on the line II—II of FIGURE 1, a detail being shown in section on the line IIa—IIa of FIGURE 1.

The unit shown in the drawings provides three support means, each indicated generally by 1. The support means 1 extend side-by-side in the fore-and-aft direction of the unit and the position of each is individually adjustable in a vertical plane. The unit shown in the drawings is especially suitable for use in forming a panel by welding together an array of alternate tubes and spacing strips (such as are indicated at 2 and 3 respectively in FIGURE 1), the tubes and spacing strips being set up on a bed in the juxtaposition that they will have in the panel and the welds between the tubes and the spacing strips being effected in a group of six, one group being effected by each run of the unit.

The unit shown in the drawings includes a base plate 5 to which are welded two parallel, downwardly extending, side members 6. Spindles 7 and 8 extend between the front and rear ends respectively of the side members 6. Three links 9 are each pivoted at one end to the front spindle 7 and three links 10 are each pivoted at one end to the rear spindle 8. Each of the links 9 and 10 is formed (as is shown most clearly by the links 9 in FIGURE 1) by a bar welded at each end to a cylinder of which the axes are parallel to each other and perpendicular to the longitudinal direction of the bar.

Each of the supports means 1 includes a composite beam 11 and a bar 12 welded to, and extending upwardly from, the forward end of the beam 11. The upper end of each bar 12 is forked and connected to one of the links 9 by a pin 13 passing through the forked end of the bar 12 and the cylindrical end of the link 9. The rear end of each beam 11 is similarly forked and connected to one of the links 10 by means of a pin 14 passing through the forked end of the beam 11 and the cylindrical end of the link 10. The relative positions of the axes about which the ends of the links 9 and 10 can pivot are such that the links 9 and 10 are parallel to each other so that the support member 1 can move vertically with the beam 11 moving parallel to itself.

To control the vertical position of the beams 11, each is associated with means, indicated generally at 15, that urges the beam 11 downwardly and each beam 11 is associated with means, indicated generally at 16, which adjustably limits the downward movement of the beam 11.

A bar 17 is welded at each of its ends to the rear ends of the side members 6. Each of the means 15 includes a cylinder 18 welded to, and extending rearwardly from, the bar 17. A cylindrical cap 19 can slide telescopically over the cylinder 18 and a rod 20, having an eye 21 at one end pivotally connected to the link 10 with which the means 15 is associated, extends axially through the cylinder 18 and the cap 19. The end of the rod 20 remote from the eye 21 projects beyond the cap 19 and is externally threaded at 22 to receive a nut 23, which abuts the end of the cap 19. A spring 25 encircling the rod 20 abuts at one end the bar 17 and, at the other end, the end of the cap 19. The spring 25 thus urges the cap 19 away from the bar 17 and since the cap 19 abuts the nut 23, the rod 20 will be urged axially of itself in a direction that tends to move the associated link 10 downwardly. The compression on the spring 25 can be varied by adjusting the position of the nut 23 along the thread 22.

Each of the means 16 is associated with a further bar 26 welded at its ends to the rear ends of the members 6 and includes a rearward extension 10a of the link 10. The outer end of the extension 10a is pivotally connected by a pin 27 to the eye 28 of an eye bolt 29. The eye bolt 29 extends rearwardly through the bar 26 and its rear end is externally threaded at 30. A nut 31 is screwed on to the thread 30 and comes into contact with a flange on a bush 32 lining the opening in the bar 26 through which the eyebolt 29 passes. To ensure that the nut 31 cannot escape from the thread 30, a disc 34 is fixed to the end of the eye bolt 29 by means of a screw 35. By adjusting the position of the nut 31 along the thread 30, the extreme downward position of the associated support means 1 can be varied.

The composite beam 11 of each of the support means 1 contains three rectangular blocks 11a separated by portions machined to provide pins 11b (see FIGURE 1). A welding nozzle support block 40 is mounted on each of the pins 11b and is arranged to tilt about the axis of the pin 11b. Each block 40 is made from insulating material and includes a part 40a of U-shaped cross-section which straddles the pin 11b and a flanged fillet 40b which fits into the space between the limbs of the part 40a and is held in position by screws, indicated at 41 in FIGURE 1, that pass through the flanges of the fillet 40b into the part 40a. The block 40 is thus captive on the pin 11b but can nevertheless tilt about it.

Into each of the upport blocks 40 is screwed a welding nozzle 42 including a tube 42a terminating immediately above the work. The nozzle 42 is held in position by an arrangement of locknuts indicated at 43.

The orientation of the welding nozzle support block 40 is determined by means associated with a stirrup 44 bolted at its ends to the blocks 11a at each side of the block 40 with which it is associated. A turnscrew 45 passes through the transverse portion 44a of the stirrup 44 and carries at its lower end a bracket 46 so mounted that the turnscrew 45 may rotate in the threaded transverse portion 44a of the stirrup 44 without rotating the bracket 46. A link 47 is pivotally connected at one end to the bracket 46 and at its other end to the block 40, this other end lying in a recess in the block 40 and being connected to the block 40 by a pin 48 passing through the link 47 and the portions of the block 40 that lie at each side of the recess. Thus, by twisting the turnscrew 45, the inclination of the block 40, and hence the inclination to the vertical of the tip of an electrode (not shown) passing through the welding nozzle 42, may be varied.

Each of the two blocks 40 provided on each of the support members 11 is provided with a welding nozzle 42 and means for tilting the block 40. As is most clearly shown in FIGURE 3, the disposition of the welding nozzle 42 and the tilting means on one block 40 is reversed relatively to the disposition of the welding nozzle 42 and the tilting means on the other block. Thus similar nozzles 42, inclined relatively to each other, may be used for welding the two edges of a spacing strip 3 simultaneously. For welding tubes having a 2½" outer diameter at 3" pitch with spacing strips between them, the inclination of the tube 42a is such that the welding electrode points into the welding zone at an angle of 12½° to the vertical in a plane perpendicular to the direction of travel.

The central and rearmost of the blocks 11a are each provided with means 50 by which shielding gas may be led to the welding zone and a return electrode indicated generally at 51.

The means 50 by which shielding gas may be led to the welding zone includes a tube 52 screwed, by turning at 53, into an opening in the block 11a until the flange 54 abuts the block 11a. The upper end of the tube 52 is clipped at 55 to an extension tube 56 leading to a source of carbon dioxide. The opening in the block 11a into which the tube 52 is screwed is inclined downwards forwardly so that the lower end of the tube 52 lies close to the lower end of the welding nozzle 42. The lower end of the tube 52 is cut obliquely along a plane that slopes downwardly rearwardly.

The return electrode 51 includes, as is shown most clearly in FIGURE 1, a roller 60 urged during the welding operation to roll along two adjacent tubes 2 and its periphery is shaped to conform to the surfaces on which it rolls. The roller 60 is mounted on an axle 61 lying on insulating bushes 62 supported by the lower ends of the arms 63a of a stirrup 63. The axle 61 lies about three inches to the rear of the preceding welding electrode. The maximum separation between the return electrode and the welding electrode that may be obtained without arc blow occurring depends upon the conditions in which the weld is made but it is preferable that the distance be kept as short as possible. The cross-piece 63b of the stirrup is welded to the lower end of tube 64 which extends upwardly through an insulating bush 65 lining an opening in the block 11a. A spring 71 encircling the tube 64 is compressed between the lower surface of block 11a and the stirrup 63, the compression of the spring being controlled by a nut 66 screwed on to the upper end of the tube 64 and which abuts the upper surface of the block 11a to limit the downward movement of the upper end of the tube 64. The bore and the lower end of the tube 64 are lined with insulating material 67 providing a bush in which a rod 68 of conducting material may slide. A collecting brush 69 of phosphor bronze having a groove (see FIGURE 1) co-operating with a peripheral rib on the roller 60, is mounted at the lower end of the rod 68 and is urged into contact with the periphery of the roller 60 by means of a spring 70 compressed between the brush 69 and the insulating material 67. A terminal screw 73 is screwed into the upper end of the rod 68.

A stirrup 80 is bolted beneath the foremost block 11a and carries at its lower end a spindle 81 on which rolls the guide roller 82. The guide roller 82 is intended to roll along adjacent tubes 2 to guide the support means 11 on which it is mounted. The periphery of the guide roller 82 is shaped to conform to the tubes on which it rolls. Chromium plated guard plates 83 are associated with each of the rollers 60 and 82 to protect them from spatter during the welding process.

The unit shown in the drawings may be mounted in a structure (not shown) which enables it to be moved above an array of tubes 2 and spacer strips 3 in the formation of a tube panel.

Such a structure may include a bed in which a number of beams are mounted parallel to each other. The upper edges of the beams are provided with arcuate recesses such that the tubes 2 that are included in the panel may rest in the recesses transversely of the beams in the juxtaposition that they will have in the panel. The spacer strips 3 may rest on the upper edges of the beams between the arcuate recesses. Tracks may be disposed at each side of the bed, parallel to the tubes lying on the bed, and two trolleys, electrically synchronized to operate simultaneously, are arranged to run one on each of the tracks. A gantry supported by the trolleys straddles the bed and a truck is arranged to move along the gantry. It can thus be moved along the gantry transversely of the bed to lie above any group of the tubes, and be moved lengthwise of the group of tubes by moving the trolleys synchronously along the tracks.

The base plate 5 of the unit illustrated in the drawings is fixed to the lower end of a beam extending downwardly from the truck and which may be moved towards and away from the bed hydraulically. A further, similarly reciprocable, beam may be mounted on the truck and carry pressure rollers adapted to roll in contact with the work ahead of the unit to ensure that the work is properly positioned. The beam to which the unit shown in the drawings is connected also carries reels of electrode wire and means of a known kind for withdrawing wire from the reels and feeding it through the welding nozzles 42.

A bulk liquid storage tank of carbon dioxide may be mounted on or by the structure and carbon dioxide will flow to the tubes 52 through flexible conduits. The simplicity with which the shielding gas may be supplied is a notable improvement over the more complex requirements for flux supply and recovery of the submerged arc process.

In forming the panel, the components of the panel may be welded together on both sides of the panel by a process in which the welds on the first side are effected by a short circuit shielded arc technique. This uses currents of about 200 amps at 18–20 arc volts, for instance, and produces welds that are not very penetrating. The electrode extension is between ½" and ¾". The speed of travel along the array of tubes is in the order of 36 inches/minute and the tolerances with which the component tubes and spacer strips are set up for this process are comparatively wide. They are wider, for instance, than those permitted in the submerged arc process so that less time and skill is required in setting up the work. The contraction forces are also less than those entailed in the submerged arc process, the "setting up pitch" of tubes 2½" in outer diameter, at 3" pitch, being about ³⁄₆₄" greater than the pitch in the panel welded by the shielded gas process.

In welding the first side of the panel, welds between four tubes lying at the centre of the array are effected first. Three tubes, forming a second group, at one side of this first group, and separated therefrom by three tubes, are then welded together and three tubes on the other side of the first group, forming a third group, and separated from the first group by three tubes, are then welded together. This procedure is followed until the sides of the panel are reached when the unwelded groups of tubes are then welded together and to the groups on either side of them.

When the welding of one side of the panel has been completed, the panel is reversed and the welds on the second side are completed by a spray transfer gas shielded technique. This produces more deeply penetrating welds, is effected at a speed of about 60 inches per minute and uses currents in the order of 400–500 amps at 24–27 arc volts. The electrode extension is much the same as that for the short circuit technique.

In other ways of forming a tube panel, the welds could be effected on only one side of the panel. Alternatively, a spray transfer technique could be used on both sides but then the initial set up would be to within closer tolerances. A short circuit technique could also be used on both sides. This is especially suitable when the tubes are of small wall thicknesses but then care must be taken to avoid blow through of the tubes.

On the second side, the order in which the groups of tubes are welded together is the reverse of that on the first side. By welding in this sequence, the overall distortion of the panel produced by the whole welding process is minimized.

In the unit described with reference to the accompanying drawing, it is intended that carbon dioxide should be supplied as the shielding gas and directed to the welding zone from behind the welding electrode. Other gases, such as argon, may be used however. Moreover, the gas may be directed to the welding zone from the front or the tube through which it reaches the welding zone may encircle the tube 42a through which the welding electrode passes. The latter, however, forms a somewhat bulky arrangement and is generally, for that reason, not preferred.

The support means 1 shown in the drawings may also be modified by providing only one return electrode for the two welding electrodes carried by the support means. With such an arrangement, the two welding electrodes would be disposed as close together as possible and the return electrode would trail immediately behind the rear welding eletcrode.

The unit illustrated in the drawings is suitable for simultaneously welding three spacer strips to the tubes that flank them. Effecting several welds in a single pass not only saves time but limits the distortion of the tubes being welded but it will be realised that each weld could be effected separately by a simple arrangement of a single welding electrode and a return electrode which follows it closely. Moreover, spacer strips could be eliminated and the tubes welded to each other. To facilitate this, fins may be formed on the tubes.

I claim:

1. The method of forming an integrated multiple tube panel composed of substantially parallel spaced metal tubes integrally united by metal webs interposed between the tubes, said method comprising the steps of arranging at least a pair of relatively elongated metal tubes in spaced substantially parallel relation; disposing a relatively elongated metal web between said pair of tubes with its side edges substantially adjacent the tube surfaces to form therewith a pair of lines to be welded; juxtaposing each of a pair of fusible metal electrodes with a respective one of said lines with one of the electrodes in advance of the other electrode; disposing each of a pair of return roller electrodes in contact with the tubes and immediately behind a respective one of said fusible electrodes; establishing arcs between each of said fusible electrodes and the workpieces to fuse metal from the fusible electrodes to coalesce with metal of the workpieces; conjointly feeding said fusible electrodes toward said lines as metal is fused from the arcing ends of the fusible electrodes and supplying a gaseous medium in the direction of the arcing end of each of the fusible electrodes to shield the arcs; and conjointly advancing the fusible electrodes along said lines and the roller electrodes along said tubes to form a pair of fusion welds independent of each other and each uniting a different one of the tubes to the adjacent edge of the web disposed therebetween, with each roller electrode behind its respective fusible electrode a distance which is less than that at which arc blow would occur.

2. Electric welding apparatus for simultaneously weld uniting into an integrated multiple tube panel section a plurality of relatively elongated metal tubes arranged in laterally spaced substantially parallel relation with relatively elongated metal web members disposed between said tubes, said apparatus comprising, in combination, a movable carriage disposed above the tubes; a support structure mounted on said carriage; a welding head mounted on said support structure and including a pair of fusible electrodes, one in advance of the other, for simultaneously weld uniting both edges of the web member to the adjacent tubes to form a panel unit, a pair of return roller electrodes in rolling contact with the tubes and each disposed behind a respective one of said fusible electrodes a distance which is less than that at which arc blow would occur, and means for supplying a gaseous medium in the direction of the arcing end of each of the fusible electrodes to shield the arc; and means for conjointly advancing the fusible electrodes and roller electrodes along the tubes.

3. The method according to claim 1 including the step of maintaining the tubes and web in stationary position, and wherein the pair of independent fusion welds is formed simultaneously.

4. Electric welding apparatus for weld uniting work, wherein said work includes a plurality of elongated metal tubes arranged in laterally spaced substantially parallel relation with elongated metal web members disposed between said tubes, and wherein said tubes and web members are simultaneously weld united into an integrated multiple tube panel section, said apparatus comprising, in combination, a movable carriage disposed above said tubes; a support structure mounted on said carriage; a welding head carried by said support structure and including a pair of fusible electrodes supported one in advance of the other for simultaneously weld uniting both edges of the web member to the adjacent tubes to form a panel unit, at least one roller electrode in rolling contact with the work and disposed in the path traveled by said fusible electrodes a distance therefrom which is less than that at which arc blow would occur, and means for supplying a gaseous material in the direction of the arc weld of each of the fusible electrodes to shield the arc; and means for conjointly advancing the fusible electrodes and roller electrode along the tubes.

5. Electric welding apparatus according to claim 4 including means for maintaining the tubes and web members in stationary position.

References Cited by the Examiner

UNITED STATES PATENTS

| | | | |
|---|---|---|---|
| 2,504,868 | 4/1950 | Muller et al. | 219—130 |
| 2,886,696 | 5/1959 | Tuthill et al. | 219—137 |
| 2,981,824 | 4/1961 | Kitrell | 219—125 |
| 2,993,983 | 7/1961 | Carpenter et al. | 219—124 |

FOREIGN PATENTS

| | | |
|---|---|---|
| 118,221 | 6/1930 | Austria. |
| 725,424 | 2/1932 | France. |
| 357,062 | 9/1931 | Great Britain. |

RICHARD M. WOOD, *Primary Examiner.*